(12) United States Patent
Minjeur et al.

(10) Patent No.: US 11,872,923 B1
(45) Date of Patent: Jan. 16, 2024

(54) VEHICLE INCLUDING A ROOF RAIL MOUNTED HOIST SYSTEM

(71) Applicant: GM Global Technology Operations LLC, Detroit, MI (US)

(72) Inventors: Patrick Minjeur, Sterling Heights, MI (US); Owen Rauch, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/888,619

(22) Filed: Aug. 16, 2022

(51) Int. Cl.
*B60P 1/54* (2006.01)

(52) U.S. Cl.
CPC .................................. *B60P 1/5419* (2013.01)

(58) Field of Classification Search
CPC ...... B60P 1/5419; B60P 1/5409; B60P 1/5452
USPC ......................................................... 414/543
See application file for complete search history.

(56) References Cited

U.S. PATENT DOCUMENTS

| | | | |
|---|---|---|---|
| 2,650,725 A * | 9/1953 | Hoyer | A61G 3/062 5/81.1 R |
| 4,249,853 A * | 2/1981 | Lyvers | A61G 3/0808 212/230 |
| 5,857,832 A * | 1/1999 | Al-Temen | B60N 2/2812 280/727 |
| 6,082,561 A * | 7/2000 | Bembas | B60P 1/5452 212/253 |
| 6,547,507 B1 * | 4/2003 | Gest | B66C 23/44 414/543 |
| 11,479,181 B1 * | 10/2022 | Leonard | B60R 9/042 |

* cited by examiner

*Primary Examiner* — Jonathan Snelting
(74) *Attorney, Agent, or Firm* — CANTOR COLBURN LLP

(57) ABSTRACT

A roof rail hoist system includes a support rail mountable to a vehicle roof. The support rail includes a first end, a second end, and an intermediate portion including a recess that extends between the first end and the second end. A winch arm is mounted to the support rail. The winch arm is pivotable between a first position, wherein the winch arm resides in the recess and a second position, wherein the winch arm extends outwardly from the support rail. A winch motor is mounted to the support rail. The winch motor includes a cable spool. A winch cable is provided on the cable spool.

20 Claims, 2 Drawing Sheets

VEHICLE INCLUDING A ROOF RAIL MOUNTED HOIST SYSTEM

INTRODUCTION

The subject disclosure relates to the art of vehicles and, more particularly, to a roof rail mounted hoist system for a vehicle.

Vans used to haul large objects may include a lift system of some form. For example, a van used to haul large objects may include a lift gate that can be lowered to receive an object and then raised to lift the object upward to be moved into a storage area or passenger compartment. Lift gates are large, heavy, and often times cumbersome to deploy. As such, lift gates are generally not available for use on most vehicles.

Vans are not the only vehicles used to transport large items. Pickup trucks, sport utility vehicles (SUV's) and even passenger vehicles may be used to transport large, heavy, and/or cumbersome items. Raising certain items onto a passenger seat or a cargo bed can be difficult, for some individuals. Accordingly, it is desirable to provide a system for raising articles to a selected height for loading into a vehicle.

SUMMARY

A roof rail hoist system, in accordance with a non-limiting example, includes a support rail mountable to a vehicle roof. The support rail includes a first end, a second end, and an intermediate portion including a recess that extends between the first end and the second end. A winch arm is mounted to the support rail. The winch arm is pivotable between a first position, wherein the winch arm resides in the recess and a second position, wherein the winch arm extends outwardly from the support rail. A winch motor is mounted to the support rail. The winch motor includes a cable spool. A winch cable is provided on the cable spool.

In addition to one or more of the features described herein, the winch arm includes a first end section pivotably mounted to the support rail, a second end section, and an intermediate section.

In addition to one or more of the features described herein, an actuator mechanism is selectively shiftable relative to the support rail to pivot the winch arm between the first position and the second position.

In addition to one or more of the features described herein the actuator mechanism includes an actuator arm having a support end that is shiftable between the first end and the second end of the support rail and a winch arm end connected to the intermediate section of the winch arm.

In addition to one or more of the features described herein, the actuator mechanism includes a scrolling shaft extending between the first end and the second end of the support rail, the actuator arm being operatively connected to the scrolling shaft.

In addition to one or more of the features described herein, the scrolling shaft includes a first end portion supported at the first end of the support rail, a second end portion supported at the second end of the support rail, and a threaded portion arranged between the first end section and the second end section, the first end of the actuator arm being threadably engaged with the threaded portion.

In addition to one or more of the features described herein, a winch arm motor is connected to one of the first end section and the second end section of the scrolling shaft.

In addition to one or more of the features described herein, the winch arm motor is mounted at the first end of the support rail.

In addition to one or more of the features described herein, a hook compartment defined in the recess, the hook compartment including a cover selectively exposes a winch hook.

In addition to one or more of the features described herein, the winch motor is mounted to the support rail at the first end of the winch arm, the winch cable extending from the cable spool through the winch arm.

A vehicle, in accordance with another non-limiting example, includes a body defining a passenger compartment, the body including a roof. A plurality of mounting rails is supported on the roof. A hoist system supported between the plurality of mounting rails. The hoist system includes a support rail mounted to the roof. The support rail includes a first end, a second end, and an intermediate portion including a recess that extends between the first end and the second end. A winch arm is mounted to the support rail. The winch arm is pivotable between a first position, wherein the winch arm resides in the recess and a second position, wherein the winch arm extends outwardly from the support rail. A winch motor is mounted to the support rail. The winch motor includes a cable spool. A winch cable is provided on the cable spool.

In addition to one or more of the features described herein, the winch arm includes a first end section pivotably mounted to the support rail, a second end section, and an intermediate section.

In addition to one or more of the features described herein, an actuator mechanism is selectively shiftable relative to the support rail to pivot the winch arm between the first position and the second position.

In addition to one or more of the features described herein, the actuator mechanism includes an actuator arm having a support end that is shiftable between the first end and the second end of the support rail and a winch arm end connected to the intermediate section of the winch arm.

In addition to one or more of the features described herein, the actuator mechanism includes a scrolling shaft extending between the first end and the second end of the support rail, the actuator arm being operatively connected to the scrolling shaft.

In addition to one or more of the features described herein, the scrolling shaft includes a first end portion supported at the first end of the support rail, a second end portion supported at the second end of the support rail, and a threaded portion arranged between the first end section and the second end section, the first end of the actuator arm being threadably engaged with the threaded portion.

In addition to one or more of the features described herein, a winch arm motor is connected to one of the first end section and the second end section of the scrolling shaft.

In addition to one or more of the features described herein, the winch arm motor is mounted at the first end of the support rail.

In addition to one or more of the features described herein, a hook compartment defined in the recess, the hook compartment including a cover selectively exposes a winch hook.

In addition to one or more of the features described herein, the winch motor is mounted to the support rail at the first end of the winch arm, the winch cable extending from the cable spool through the winch arm.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
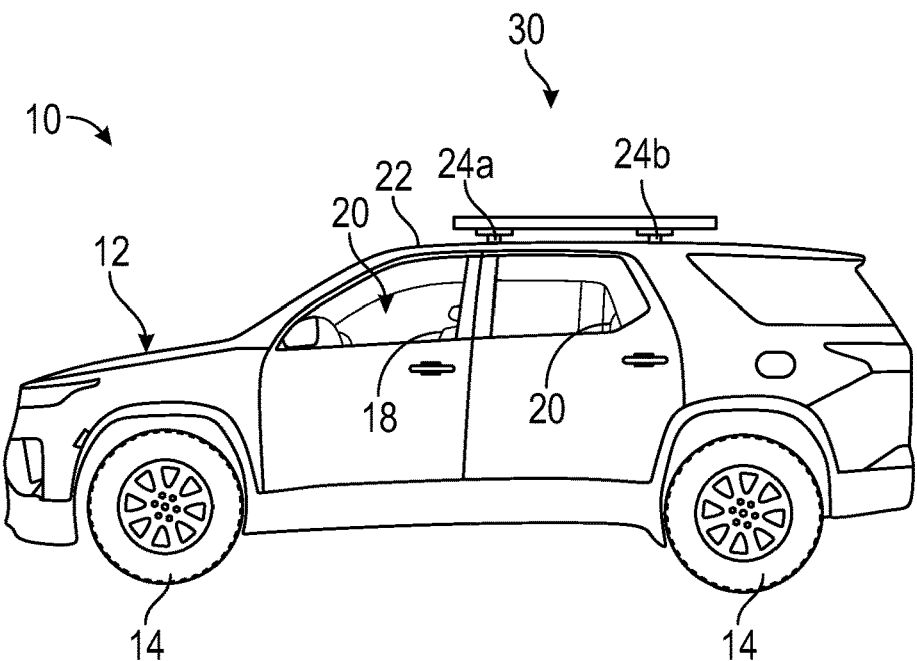
FIG. 1 is a side view of a vehicle including a roof rail mounted hoist system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels two of which are indicated at 14. Body 12 defines, in part, a passenger compartment 16 within which is arranged a driver's seat 18 and a passenger seat 20. In FIG. 1, passenger seat 20 is depicted as a rear passenger seat. However, it should be understood that the number and arrangement of passenger seats may vary. Body 12 also includes a roof 22 that supports a pair of mounting rails 24a and 24b. Mounting rails 24a and 24b support a hoist system 30. At this point, it should be understood that while vehicle 10 is shown as an SUV, hoist system 30 may be deployed on a wide array of vehicle body types.

Figure 2:
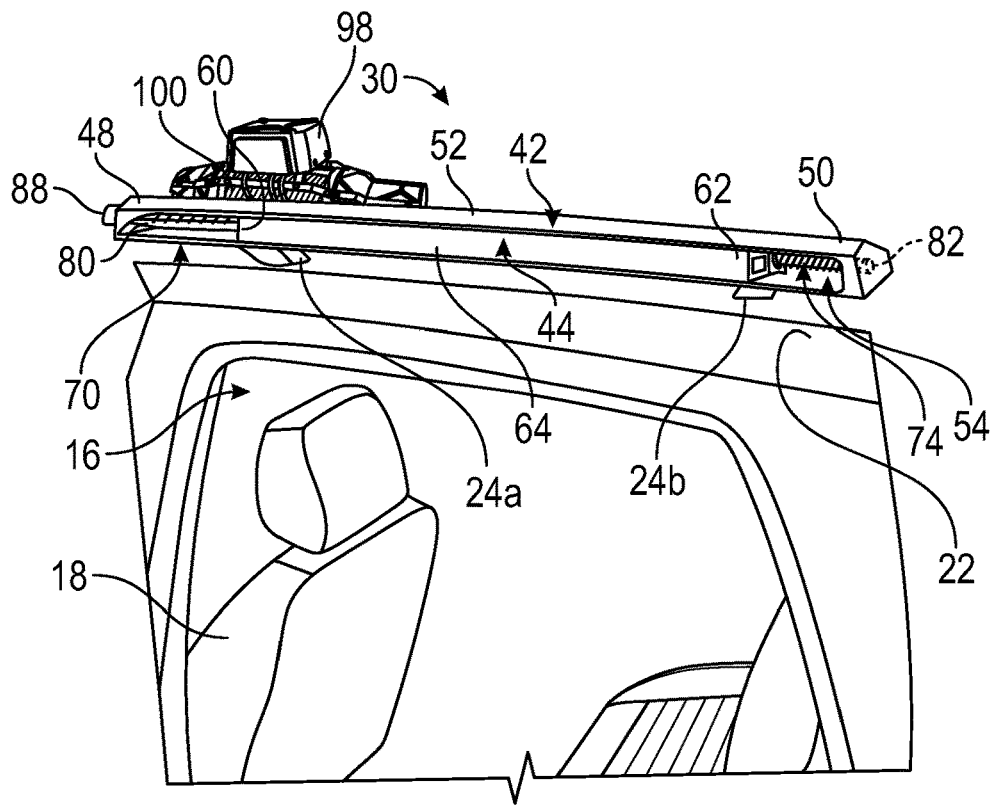
FIG. 2 is a partial perspective view of the roof rail mounted hoist system in a stowed configuration, in accordance with a non-limiting example.

Referring to FIG. 2, hoist system 30, in accordance with a non-limiting example, includes a support rail 42 and a selectively deployable winch arm 44. Winch arm 44 may be pivoted out from support rail 42 and is employed to raise and/or lower objects relative to vehicle 10 as will be detailed more fully herein. Support rail 42 includes a first end 48, a second end 50, and an intermediate portion 52 that extends between first end 48 and second end 50. Support rail 42 includes a recess or housing 54 that receives winch arm 44.

Winch arm 44 includes a first end section 60, a second end section 62, and an intermediate section 64 that extends between first end section 60 and second end section 62. Winch arm 44 is connected to support rail 42 through an actuator mechanism 70. As will be discussed herein, actuator mechanism 70 shifts winch arm 44 between a stowed configuration (FIG. 2) to an intermediate position (FIG. 3) and a fully deployed configuration (FIG. 4). The particular configuration of winch arm 44 may vary and can depend upon the object being raised.

Figure 3:
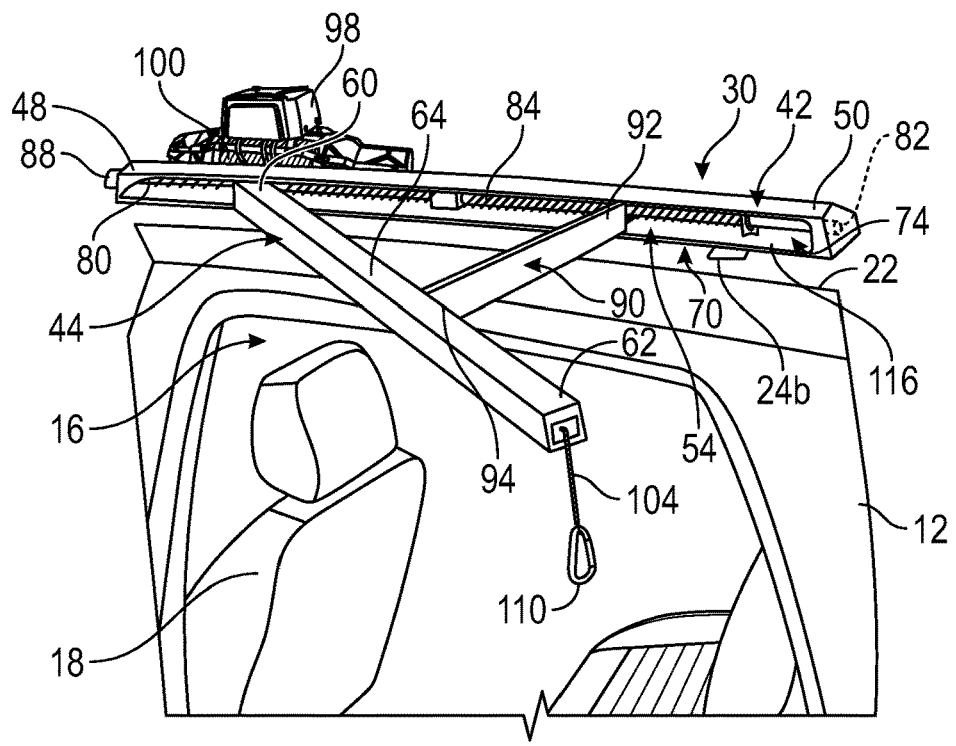
FIG. 3 is a partial perspective view of the roof rail mounted hoist system in a partially deployed configuration, in accordance with a non-limiting example.
Figure 4:
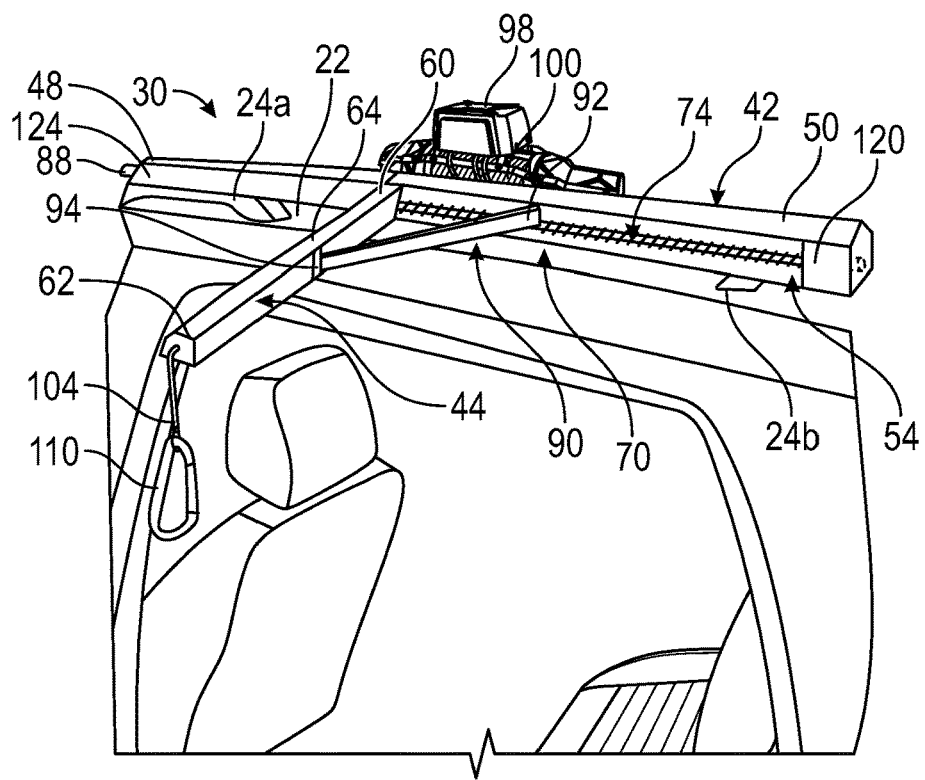
FIG. 4 is a partial perspective view of the roof rail mounted hoist system in a fully deployed configuration, in accordance with a non-limiting example.

As shown in FIGS. 2 and 3, actuator mechanism 70 includes a scrolling shaft 74 arranged in recess 54. Scrolling shaft 74 includes a first end portion rotatably supported at first end 48 of support rail 42, a second end portion 82 rotatably supported at second end 50 of support rail 42 and threaded portion 84 extending between first end portion 80 and second end portion 82. Threaded portion 84 includes a plurality of threads (not separately labeled). The plurality of threads include a selected pitch which may vary from vehicle to vehicle depending on a particular application for hoist system 30.

In a non-limiting example, actuator mechanism 70 further includes a winch arm motor 88 and an actuator arm 90. Winch arm motor 88 is mounted to first end 48 of support rail 42 and is operatively connected to scrolling shaft 74. Actuator arm 90 includes a support end 92 operatively connected to scrolling shaft 74 and a winch arm end 94 pivotally connected to intermediate section 64 of winch arm 44. Support end 92 of actuator arm 92 includes a threaded section (not shown) that engages with threaded portion 84 of scrolling shaft 74. With this arrangement, rotation of scrolling shaft 74, such as through activation of winch arm motor 88, causes support end 92 of actuator arm 90 to translate along threaded portion 84 between first end 80 and second end 82 of scrolling shaft 74 causing winch arm 44 to extend or retract relative to support rail 42.

In a non-limiting example, a winch motor 98 is connected to support rail 42 near first end section 60 of winch arm 44. Winch motor 98 includes a spool 100. A winch cable 104 is wrapped about spool 100. Winch cable 104 includes a terminal end (not separately labeled) that supports a winch hook 110. Winch hook 110 may be selectively stored in a hook compartment 116 provided in recess 54 at second end 50. A cover 120 (FIG. 4) may be provided for hook compartment 116. Another cover 124 may be disposed on rail 42. Cover 124 may be arranged between first end section 60 of winch arm 44 and first end 48 of rail 42. Winch cable 104 extends from spool 100 through winch arm 44. At this point, it should be understood that winch hook 110 may take on a variety of forms including snap hooks, j-hooks, straps, loops, and other devices that may be used to connect to and object or the winch cable to lift an object.

In a non-limiting example, winch arm motor 88 may be activated to extend winch arm 44 from the stowed configuration (FIG. 2) to the deployed configuration (FIG. 3 or FIG. 4). Winch motor 98 may be activated to lower winch cable 104 so that hook may engage an object. Winch motor 98 may then raise the object which can then be moved into passenger compartment 16. Winch arm motor 88 and/or winch motor 98 may be activated through a control (not shown) that resides in passenger compartment 16 or at support rail 42. Alternatively, a toggle (not shown) supporting a control (also not shown) may be plugged into support rail 42, winch arm motor 88 and/or winch motor 98 to control hoist system 30.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A roof rail hoist system comprising:
a support rail mountable to a vehicle roof, the support rail including a first end, a second end, and an intermediate portion including a recess that extends between the first end and the second end;

a winch arm mounted to the support rail, the winch arm being pivotable between a first position, wherein the winch arm resides in the recess and a second position, wherein the winch arm extends outwardly from the support rail;

a winch motor mounted to the support rail, the winch motor including a cable spool; and a winch cable provided on the cable spool.

2. The roof rail hoist system according to claim 1, wherein the winch arm includes a first end section pivotably mounted to the support rail, a second end section, and an intermediate section.

3. The roof rail hoist system according to claim 2, further comprising an actuator mechanism that is selectively shiftable relative to the support rail to pivot the winch arm between the first position and the second position.

4. The roof rail hoist system according to claim 3, wherein the actuator mechanism includes an actuator arm having a support end that is shiftable between the first end and the second end of the support rail and a winch arm end connected to the intermediate section of the winch arm.

5. The roof rail hoist system according to claim 4, wherein the actuator mechanism includes a scrolling shaft extending between the first end and the second end of the support rail, the actuator arm being operatively connected to the scrolling shaft.

6. The roof rail hoist system according to claim 5, wherein the scrolling shaft includes a first end portion supported at the first end of the support rail, a second end portion supported at the second end of the support rail, and a threaded portion arranged between the first end section and the second end section, the first end of the actuator arm being threadably engaged with the threaded portion.

7. The roof rail hoist system according to claim 6, further comprising a winch arm motor connected to one of the first end section and the second end section of the scrolling shaft.

8. The roof rail hoist system according to claim 7, wherein the winch arm motor is mounted at the first end of the support rail.

9. The roof rail hoist system according to claim 8, further comprising a hook compartment defined in the recess, the hook compartment including a cover which selectively exposes a winch hook.

10. The roof rail hoist system according to claim 2, wherein the winch motor is mounted to the support rail at the first end of the winch arm, the winch cable extending from the cable spool through the winch arm.

11. A vehicle comprising:
a body defining a passenger compartment, the body including a roof;
a plurality of mounting rails supported on the roof; and
a hoist system supported between the plurality of mounting rails, the hoist system comprising:

a support rail mounted to the roof, the support rail including a first end, a second end, and an intermediate portion including a recess that extends between the first end and the second end;

a winch arm mounted to the support rail, the winch arm being pivotable between a first position, wherein the winch arm resides in the recess and a second position, wherein the winch arm extends outwardly from the support rail;

a winch motor mounted to the support rail, the winch motor including a cable spool; and a winch cable provided on the cable spool.

12. The vehicle according to claim 11, wherein the winch arm includes a first end section pivotably mounted to the support rail, a second end section, and an intermediate section.

13. The vehicle, according to claim 12, further comprising an actuator mechanism that is selectively shiftable relative to the support rail to pivot the winch arm between the first position and the second position.

14. The vehicle according to claim 13, wherein the actuator mechanism includes an actuator arm having a support end that is shiftable between the first end and the second end of the support rail and a winch arm end connected to the intermediate section of the winch arm.

15. The vehicle according to claim 14, wherein the actuator mechanism includes a scrolling shaft extending between the first end and the second end of the support rail, the actuator arm being operatively connected to the scrolling shaft.

16. The vehicle according to claim 15, wherein the scrolling shaft includes a first end portion supported at the first end of the support rail, a second end portion supported at the second end of the support rail, and a threaded portion arranged between the first end section and the second end section, the first end of the actuator arm being threadably engaged with the threaded portion.

17. The vehicle according to claim 16, further comprising a winch arm motor connected to one of the first end section and the second end section of the scrolling shaft.

18. The vehicle according to claim 17, wherein the winch arm motor is mounted at the first end of the support rail.

19. The vehicle according to claim 18, further comprising a hook compartment defined in the recess, the hook compartment including a cover which selectively exposes a winch hook.

20. The vehicle according to claim 12, wherein the winch motor is mounted to the support rail at the first end of the winch arm, the winch cable extending from the cable spool through the winch arm.

\* \* \* \* \*